(12) United States Patent
Ota et al.

(10) Patent No.: US 7,622,219 B2
(45) Date of Patent: Nov. 24, 2009

(54) BATTERY PACK

(75) Inventors: Shinji Ota, Osaka (JP); Katsuyuki Shirasawa, Osaka (JP); Toshio Yamashitafuji, Osaka (JP); Takeshi Ishimaru, Osaka (JP); Kenjin Masumoto, Osaka (JP); Hiroaki Imanishi, Osaka (JP)

(73) Assignee: Panasonic Corporation, Osaka (JP)

( * ) Notice: Subject to any disclaimer, the term of this patent is extended or adjusted under 35 U.S.C. 154(b) by 383 days.

(21) Appl. No.: 10/596,716

(22) PCT Filed: Aug. 3, 2005

(86) PCT No.: PCT/JP2005/014200

§ 371 (c)(1),
(2), (4) Date: Jun. 22, 2006

(87) PCT Pub. No.: WO2006/046343

PCT Pub. Date: May 4, 2006

(65) Prior Publication Data

US 2008/0233472 A1    Sep. 25, 2008

(30) Foreign Application Priority Data

Oct. 27, 2004  (JP)  ............................. 2004-312581
Dec. 2, 2004   (JP)  ............................. 2004-349449
Feb. 28, 2005  (JP)  ............................. 2005-052580
Mar. 7, 2005   (JP)  ............................. 2005-061775

(51) Int. Cl.
*H01M 2/00*   (2006.01)
*H01M 2/08*   (2006.01)
*H01M 2/02*   (2006.01)

(52) U.S. Cl. .................. 429/163; 429/175; 429/178
(58) Field of Classification Search ................ 320/107, 320/112; 429/7, 61, 65, 121, 163, 175
See application file for complete search history.

(56) References Cited

U.S. PATENT DOCUMENTS 6,432,575 B1   8/2002   Yamagami (Continued)

FOREIGN PATENT DOCUMENTS

JP   2000-243362   9/2000

(Continued)

OTHER PUBLICATIONS

English language Abstract of JP 2004-152655.

(Continued)

*Primary Examiner*—Edward Tso
*Assistant Examiner*—Ahmed Omar
(74) *Attorney, Agent, or Firm*—Greenblum & Bernstein, P.L.C.

(57) ABSTRACT

A battery pack (10) includes: a battery (1); a circuit substrate (5) having a charge/discharge safety circuit and arranged on one end face (3) of the battery; and an end case (6) in which an external connection terminal (7) is set. In this battery pack, the circuit substrate (5) is arranged inside the end case (6), and the end case (6) is secured to the battery by screws (12) with a screw head (12*a*) extending through and engaging with the end case (6) at both ends and tips of the screw (12) being engaged into the end face (3) at both ends of the battery (1). This achieves a compact battery pack with a reduced connection resistance, while achieving both high reliability and productivity.

15 Claims, 12 Drawing Sheets

U.S. PATENT DOCUMENTS

| | | |
|---|---|---|
| 6,440,601 B1 | 8/2002 | Aoi et al. |
| 6,524,739 B1 * | 2/2003 | Iwaizono et al. ............... 429/61 |
| 6,884,540 B2 | 4/2005 | Chikada |
| 2002/0018932 A1 | 2/2002 | Chikada |
| 2002/0142195 A1 * | 10/2002 | Ehara ............................ 429/7 |
| 2004/0137314 A1 * | 7/2004 | Fukui ........................... 429/62 |
| 2004/0241541 A1 | 12/2004 | Watanabe et al. |
| 2004/0251872 A1 * | 12/2004 | Wang et al. .................. 320/112 |
| 2005/0079408 A1 | 4/2005 | Hirano |
| 2005/0112415 A1 * | 5/2005 | Takeshita et al. ............... 429/7 |

FOREIGN PATENT DOCUMENTS

| | | |
|---|---|---|
| JP | 3244400 | 10/2001 |
| JP | 2002-050329 | 2/2002 |
| JP | 2002-298809 | 10/2002 |
| JP | 2003-022790 | 1/2003 |
| JP | 2004-095329 | 3/2004 |
| JP | 2004-152655 | 5/2004 |

OTHER PUBLICATIONS

English language Abstract of JP 2003-022790.
English language Abstract of JP 2002-050329.
English language Abstract of JP 08-329913.
English language Abstract of JP 2000-243362.
English language Abstract of JP 2002-298809.
English language Abstract of JP 2004-095329.

* cited by examiner

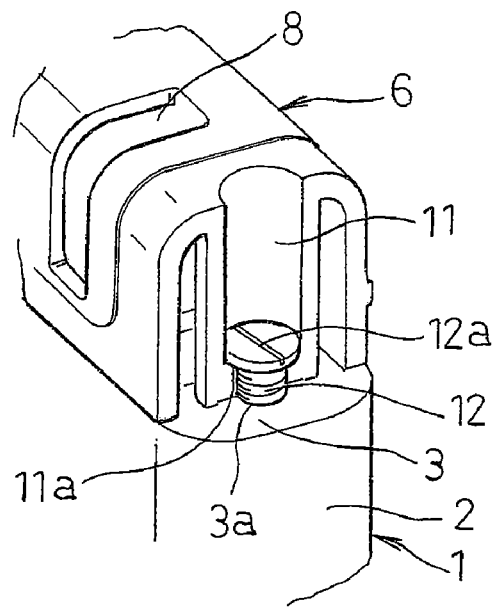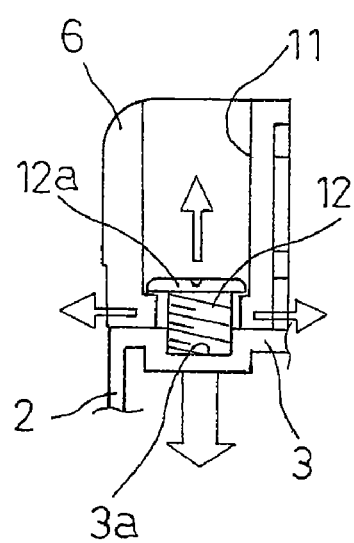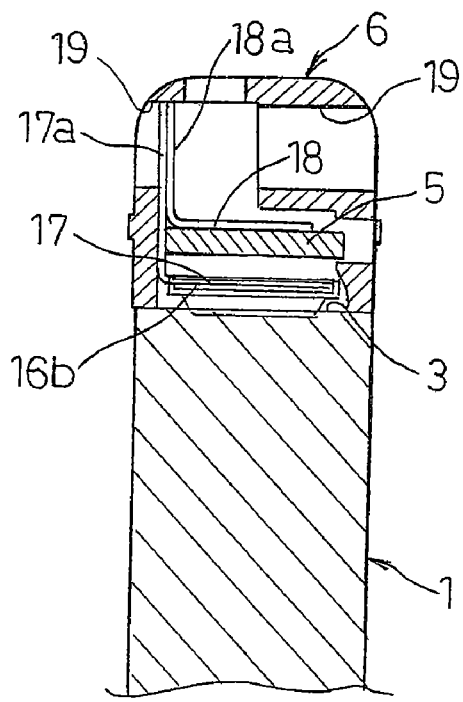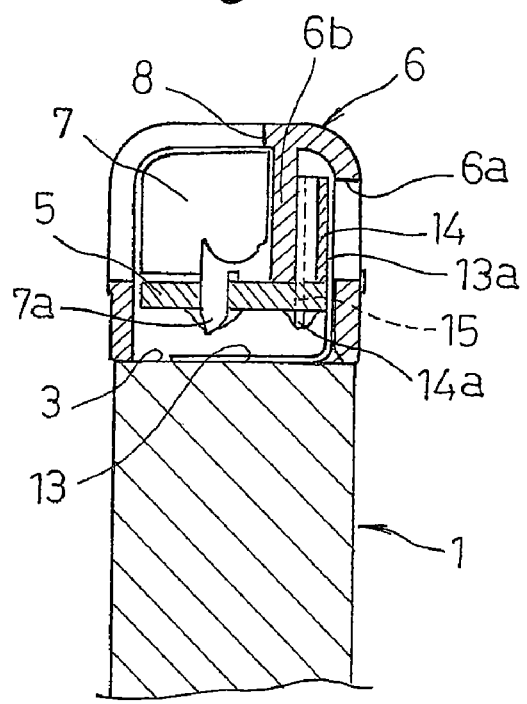

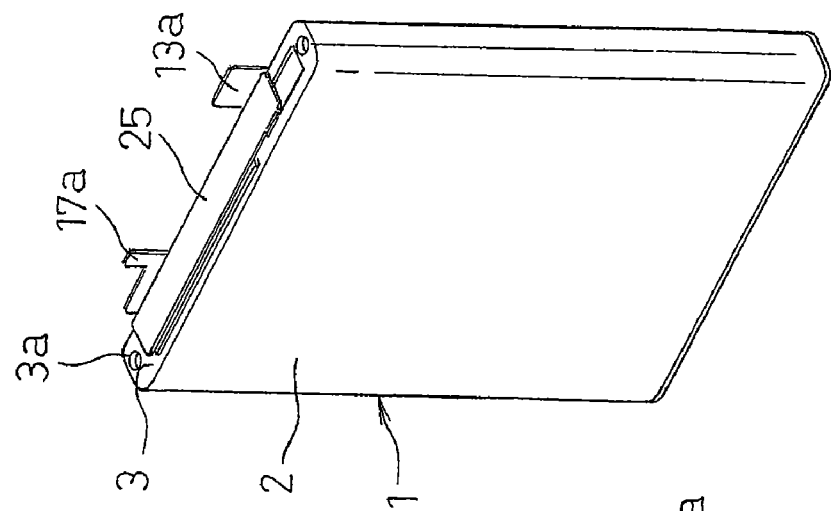
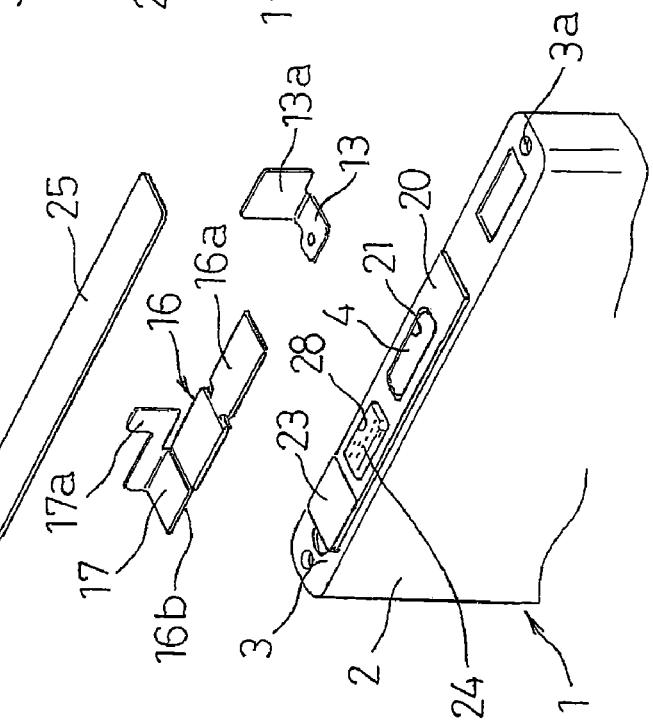
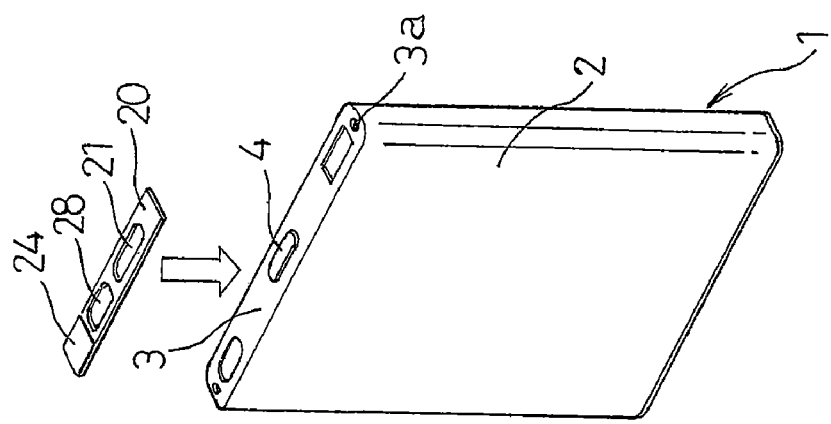

BATTERY PACK

TECHNICAL FIELD

The present invention relates to a battery pack made by coupling a battery and an end case into one piece, the end case accommodating a circuit substrate that includes a charge/discharge protection circuit and is arranged at one end of the battery.

BACKGROUND ART

A battery pack which is formed by uniting a circuit substrate having a charge/discharge protection circuit with a battery is required to have a compact structure, low connection resistance, high reliability of connected parts, and high production efficiency.

Conventional battery packs are structured such that the battery is accommodated inside a case with a protection element and a circuit substrate. To give an example, there is known a battery pack wherein a battery is accommodated in a case having a terminal window, and a protection element and a circuit substrate are arranged in a space provided between the battery and the case. A lead plate that connects the battery with the circuit substrate is arranged opposite the terminal window to serve as an external terminal (see, for example, Prior Art Document 1).

Another known battery pack uses a terminal holder having a fitting protrusion at the bottom that fits into a recess on a battery that is formed by the protruding periphery of one end face of the battery. A protection element is set inside the terminal holder, and a terminal plate is secured to the top face of the holder. After the terminal holder is coupled to the battery with an adhesive tape or heat shrink film, a lead plate that will extend to the outside is welded to the terminal plate and the battery case, and the holder and the battery are either accommodated in a case or covered by a heat shrink tube or the like to constitute a battery pack (see, for example, Prior Art Document 2).

In yet another known battery pack, the sealing plate of the battery includes a connection boss that is coupled to the circuit substrate so as to connect the battery and the circuit substrate both mechanically and electrically (see, for example, Prior Art Document 3), which is contrary to the conventional practice of connecting the battery and the circuit substrate mechanically and electrically with a lead plate, with the circuit substrate being temporarily held on the battery using a holder.

In another known battery pack, the battery is partly or entirely insertion molded such that an external connection terminal is exposed to the outside, and a resin mold in which a protection element is fixedly set is formed in one piece with the battery at its one end (see, for example, Prior Art Document 4).

Prior Art Document 1: Japanese Patent No. 3244400
Prior Art Document 2: Japanese Patent Publication No. 2000-243362
Prior Art Document 3: Japanese Patent Publication No. 2002-298809
Prior Art Document 4: Japanese Patent Publication No. 2004-95329

In the structure shown in Prior Art Document 1, however, because there is provided a space between the case and the battery for placing the protection element and the circuit substrate, the case is large. While there is the risk that the circuit substrate or protection element may be damaged by vibration, it is hard to retain them in position to the battery or case, and high reliability is hard to achieve. Further, the connection resistance is high because of the use of a lead plate.

In the structure shown in Prior Art Document 2, a protection element is securely attached to the battery through the terminal holder. A lead plate is welded to the assembly of this battery and holder, which is then accommodated in a case to form the battery pack. Therefore the battery pack is large in size and has high connection resistance. Also, it requires a large number of assembling process steps, because of which high productivity is hard to achieve.

In the structure shown in Prior Art Document 3, the circuit substrate is secured to the battery using a special sealing plate that has a connection boss so that connection is established without using a lead plate to reduce the connection resistance and the number of assembling process steps. However, these circuit substrate and battery are then accommodated in a case to form the battery pack and therefore it is large in size.

In the structure shown in Prior Art Document 4, the battery, the protection element, and the output terminal are insertion molded so that the protection element and the output terminal are secured in the resin mold. With this structure, the number of components is fewer and the battery pack is compact, but insertion molding presents other problems such as high equipment cost and difficulties in achieving high dimensional precision and high productivity.

Accordingly, in view of the above-described problems in conventional techniques, it is an object of the present invention to provide a compact battery pack having low connection resistance, high reliability, and high productivity.

DISCLOSURE OF THE INVENTION

To achieve the above object, the present invention provides a battery pack including a battery, a circuit substrate having a charge/discharge safety circuit and arranged on one end face of the battery, and an end case in which an external connection terminal is set, wherein the circuit substrate is arranged inside the end case, and the end case is secured to the battery by screws with a screw head, the screw head extending through and engaging with the end case at both ends and tips of the screw being engaged into the end face at both ends of the battery.

With this structure, the battery pack is made compact since it only requires the end case secured to one end of the battery, and also the connection resistance is reduced because the connection path between the battery and the circuit substrate and the external connection terminal inside the end case is made shorter. Further, the battery and the end case are securely coupled together by a simple process step of engaging the tip of the screw into the end face of the battery, and therefore the battery pack achieves both high reliability and productivity. Since the end case is secured to the battery with screws, the battery pack resists a large force applied in a direction parallel to the end face of the battery (shear direction to the screw), as well as a large force that acts to separate the end case from the battery (screw pulling direction), and therefore the battery pack exhibits high attachment strength to external forces from all directions.

The present invention also provides a battery pack including a battery, a circuit substrate having a charge/discharge safety circuit and arranged on one end face of the battery, and an end case in which an external connection terminal is set, wherein the circuit substrate is arranged inside the end case, and the end case is secured to the battery by coupling pins with heads, the heads of the coupling pins extending through and engaging with the end case at both ends and the tips of the coupling pins being secured to the end face at both ends of the battery.

With this structure, the battery pack is made compact since it only requires the end case secured to one end of the battery, and also the connection resistance is reduced because the connection path between the battery and the circuit substrate and the external connection terminal inside the end case is made shorter. Further, the battery and the end case are securely coupled together by a simple process step of securing the tip of the coupling pin to the battery, and therefore the battery pack achieves both high reliability and productivity.

The end face of the battery at least in a portion thereof to which the tip of the coupling pin is attached may be provided with the same type of material as the coupling pin, so that the joint has sufficient strength and high reliability because the materials joined together are of the same type. For example, when the end face of the battery is made of aluminum or an aluminum alloy as with the battery case while the coupling pin is made of an iron material so as to secure sufficient strength despite its small size, there may be cases where, by a resistance welding method, it is hard to achieve necessary attachment strength with high reliability. If the end face of the battery in a portion where the tip of the coupling pin will be attached is made of the same material as the coupling pin, then a highly reliable joint is readily achieved.

The method of providing the portion in one end face of the battery opposite the tip of the coupling pin with the same material as the coupling pin includes forming the end face of the battery using a compound material such as a clad plate of aluminum or an aluminum alloy and steel plate bonded together, and securely attaching the same material as the coupling pin to the material forming the end face of the battery by laser welding or electronic beam welding. Preferably, and more easily, a screw that is made of the same material as the coupling pin may be tightened to the battery.

The present invention also provides a battery pack including a battery, a circuit substrate having a charge/discharge safety circuit and arranged on one end face of the battery, and an end case in which an external connection terminal is set, wherein the circuit substrate is arranged inside the end case, and the end case is secured to the battery by a coupling pin with head, the head extending through and engaging with the end case, such that the material forming the end face of the battery bites into a recess formed in an outer periphery at the tip of the coupling pin to secure the tip of the coupling pin to the end face of the battery.

With this structure, the battery pack is made compact since it only requires the end case secured to one end of the battery, and also the connection resistance is reduced because the connection path between the battery and the circuit substrate and the external connection terminal inside the end case is made shorter. Further, the coupling pin is securely engaged with the end face of the battery such that the material forming the end face of the battery bites into a recess formed in the outer periphery at the tip of the coupling pin. Therefore, as compared to the case where the coupling pin is merely secured to the end face of the battery at the tip, the battery pack resists a large force applied in a direction parallel to the end face of the battery (shear direction to the pin) and a large force that acts to separate the end case from the battery (pin pulling direction). The battery pack thus has high attachment strength to external forces from all directions and has high reliability.

Preferably, the coupling pin should include a protrusion at the tip that has the recess in its peripheral surface, and the end face of the battery should include a hole to which the protrusion at the tip of the coupling pin fits, and with the protrusion being fitted in the hole, the tip of the coupling pin and the end face of the battery are joined together by resistance welding, so that the material forming the end face of the battery melts by the resistance welding operation and bites into the recess and the battery and the end case are firmly united together as described above. Thus highly reliable battery pack is formed with a simple process using resistance welding, and productivity and high reliability are both achieved.

Preferably, the battery case serves as an electrode terminal of one polarity and an electrode terminal of the other polarity is provided on the end face in the battery. A first connection bracket having an upright portion is secured to the end face of the battery case, a connection plate that makes surface contact with the upright portion of the first connection bracket and that is partly connected to the circuit substrate is arranged on the inner side of one side wall of the end case, and the upright portion and the connection plate are welded together through an aperture formed in one side wall of the end case opposite the upright portion. With this structure, the connection path is made short and the connection resistance is reduced. Also, the electrical connection is established with good working efficiency, ensuring high productivity.

Preferably, the battery case serves as an electrode terminal of one polarity and an electrode terminal of the other polarity is provided on the end face in the battery, and one end of a safety protection device is connected to the electrode terminal in the end face of the battery case, while the other end of the safety protection device is connected to the circuit substrate. This way, the safety protection device such as a temperature fuse or PTC element is interposed between the electrode terminal and the circuit substrate in contact with or in close proximity to the end face of the battery making use of the space in one side of the electrode terminal, so that the electric current is shut off when the temperature of the battery rises too high, and thus while the structure is compact, the safety features are improved.

Second and third connection brackets having upright portions that overlap each other are secured to the other end of the safety protection device and the circuit substrate, respectively, and these upright portions of the second and third connection brackets are welded together through an aperture opened in the end case. Thus, the circuit substrate and the safety protection device are connected to each other through the second and third connection brackets with good productivity by the welding operation through the aperture in the end case.

The external connection terminal set in the end case should preferably be of the type that establishes or shuts connection between the battery and a device to be connected by a connector on the equipment side being inserted or removed. In a portable electronic equipment or the like that has a battery accommodating space in which the battery pack is set, the external connection terminal of this type supplies power with remarkably higher stability as compared to the flat type terminal, to which the electrode terminal of the equipment is merely abutted. Thus, the external connection terminal of this type ensures highly reliable power supply even in an environment of use in which the equipment may be subjected to vibration or impact, and also is set inside the end case easily and compactly.

BRIEF DESCRIPTION OF THE DRAWINGS

FIG. 2A and FIG. 2B illustrate the main structure of the battery pack according to the first embodiment, FIG. 2A being a partially broken perspective view taken from the direction of arrow IIA of FIG. 1 and FIG. 2B being a cross-sectional view of the same part;

FIG. 3A and FIG. 3B illustrate the main structure of the battery pack of the present invention, FIG. 3A being a cross-sectional view taken along the line IIIA-IIIA of FIG. 1, FIG. 9, and FIG. 13 and FIG. 3B being a cross-sectional view taken along the line IIIB-IIIB of FIG. 1, FIG. 9, and FIG. 13;

FIG. 4A to FIG. 4C are perspective views illustrating the battery pack of the present invention in the order of the assembling process steps;

BEST MODES FOR CARRYING OUT THE INVENTION

The battery pack of the present invention will be hereinafter described with reference to FIG. 1 to FIG. 17B.

First Embodiment

Figure 1:
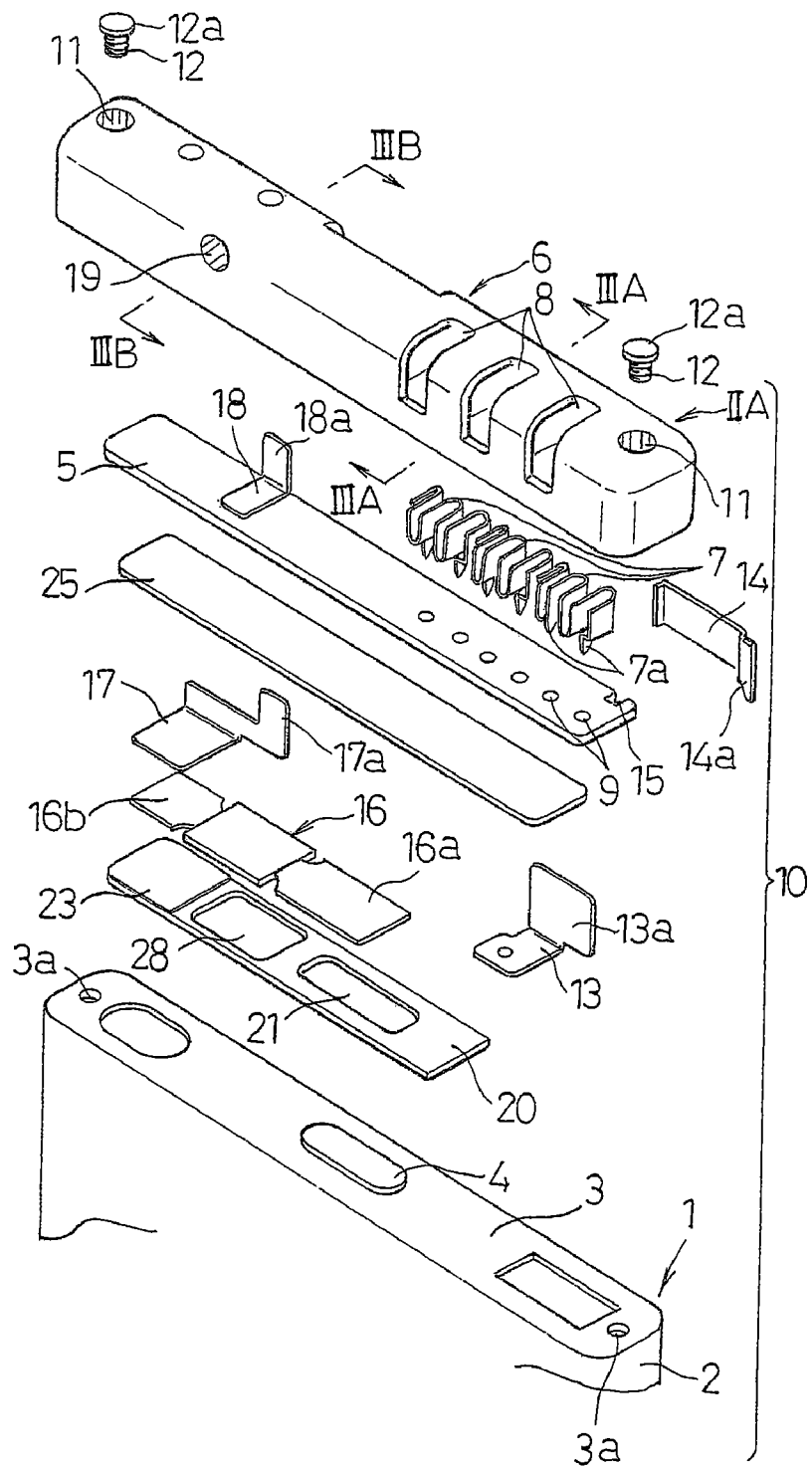
FIG. 1 is an exploded perspective view illustrating major parts of a battery pack according to a first embodiment of the present invention.

In FIG. 1, the numeral 1 denotes a prismatic battery having a flat rectangular, rounded rectangular, or oval cross section. The battery 1 is structured as a lithium ion battery, containing elements for electromotive force, i.e., an electrode plate assembly and liquid electrolyte, inside a battery case 2. The electrode plate assembly is made of strips of positive and negative electrode plates wound around with a separator interposed therebetween to have a multilayer structure. The positive electrode plate consists of a core material made of aluminum foil and positive electrode mixture paste coated and dried on the core material, the negative electrode plate consists of a core material made of copper foil and negative electrode mixture paste coated and dried on the core material, and the separator is made of a microporous polypropylene film or the like.

An electrode terminal 4 is provided to protrude in the center in one end face 3 of the battery case 2. The electrode terminal 4 extends through the end face 3 of the battery case 2 in an insulated and airtight manner, to serve as the negative electrode terminal of the battery 1. The battery case 2 serves as the positive electrode terminal of the battery 1.

The numeral 5 denotes a circuit substrate arranged upon the end face 3 of the battery case 2, and it includes a charge/discharge safety circuit. The numeral 6 denotes an end case secured on the end face 3 of the battery case 2, with the circuit substrate 5 being accommodated inside. The end case 6 is attached to the battery, with three external connection terminals 7 being set inside. These external connection terminals 7 are of the type that establishes or shuts connection between the battery and a device to be connected by the connectors on the device side being inserted or removed; they are respectively arranged opposite three suitably spaced connection windows 8, which extend over the top face and one side face at one end of the end case 6. Each external connection terminal 7 is formed with a pair of connection legs 7a extending downwards, and the circuit substrate 5 has corresponding connection holes 9, through which these connection legs 7a are extended for soldering. Two of the three external connection terminals 7 are for the positive and negative electrodes, the remaining one being a connection terminal for detecting resistance for identification purposes.

The battery pack 10 is chiefly composed of the above-described battery 1 and the end case 6 accommodating the circuit substrate 5, being secured to each other. To securely unite the battery and the end case, as shown in FIG. 1 to FIG. 2B, the end case 6 includes attachment holes 11 at both ends extending in the vertical direction and having a step 11a near the bottom end, and screws 12 are inserted in these attachment holes 11, with the screw heads 12a being engaged with the steps 11a, and the screw tips are driven into one end face 3 at both ends of the battery case 2.

This screw tightening is described in more detail below with reference mainly to FIG. 2B. The battery case 2 is made of aluminum or an aluminum alloy including its end face 3. The end face 3 has a relatively large thickness of, for example, about 0.8 to 1.5 mm. At either end of the end face 3, a circular indentation 3a is press-formed as a screw pilot hole so that the screw 12 is turned into the hole while forming female threads. For example, if the screw 12 has metric fine screw threads with a nominal diameter of 1.2 mm, the screw thread height is 0.13 mm and the screw pitch is 0.25 mm. If the circular indentation 3a has an inside diameter of 0.9 mm and a depth of 1.4 mm, the screw 12 will engage into the indentation 3a about four threads, whereby, if the end face 3 is made of aluminum or an aluminum alloy, the screw 12 is attached with a necessary strength in the axial direction.

The specification of the screw 12 given above is only an example, and any of fine thread screws with a nominal diameter ranging from 1.0 to 2.0 mm and a screw pitch ranging from 0.2 to 0.4 mm may preferably be used. Correspondingly, the circular indentation 3a may vary in its inside diameter from 0.6 to 1.7 mm, and in its depth from 0.8 to 1.6 mm.

Next, the electrical connection structure of this battery pack 10 will be described. The battery case 2, which is the positive electrode, is connected to the circuit substrate 5 through a first connection bracket 13 and a connection plate 14. The first connection bracket 13 is secured to one end face of the battery by welding, and has an upright portion 13a on one side. This upright portion 13a extends upwards, making contact with the inner face of one side wall of the end case 6, as shown in FIG. 3A. The connection plate 14 is arranged on the circuit substrate 5 so that it makes surface contact with the inner face of the upright portion 13a of the first connection bracket 13. A connection leg 14a extending downward from the bottom fits in a connection notch 15 formed to one side of the circuit substrate 5, and is soldered to a connection electrode formed on the underside of the connection notch 15. The end case 6 includes a support wall 6b for supporting the connection plate 14 from inside. The end case 6 also includes an aperture 6a provided for the processing purpose in one side wall opposite the upright portion 13a. A pair of welding electrodes are pressed against the upright portion 13a of the first connection bracket 13 through this aperture 6a and a welding current is applied across the electrodes, so that the upright portion 13a and the connection plate 14 are welded together to establish electrical connection.

Figure 9:
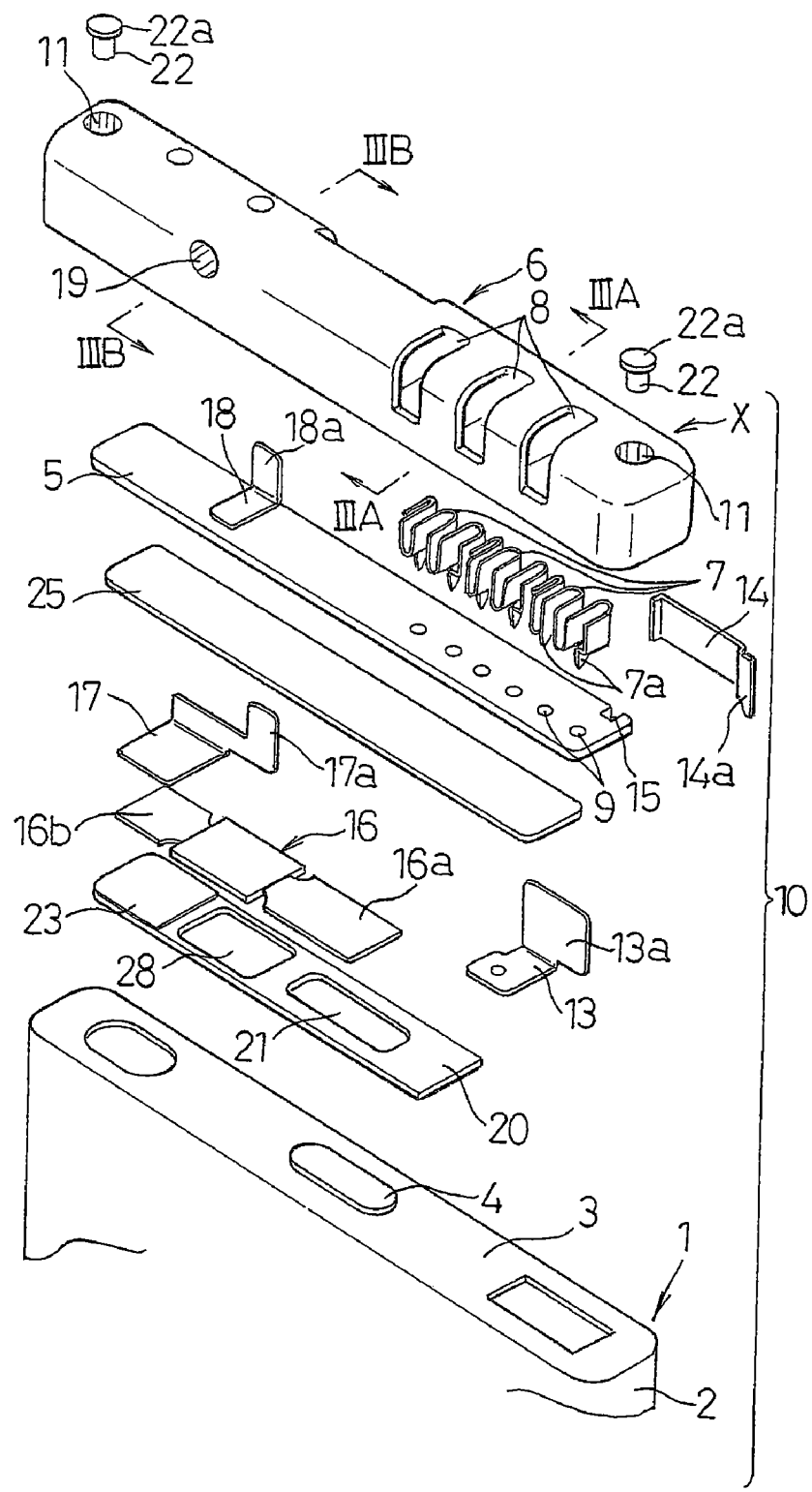
FIG. 9 is an exploded perspective view illustrating major parts of a battery pack according to a second embodiment of the present invention.
Figure 13:
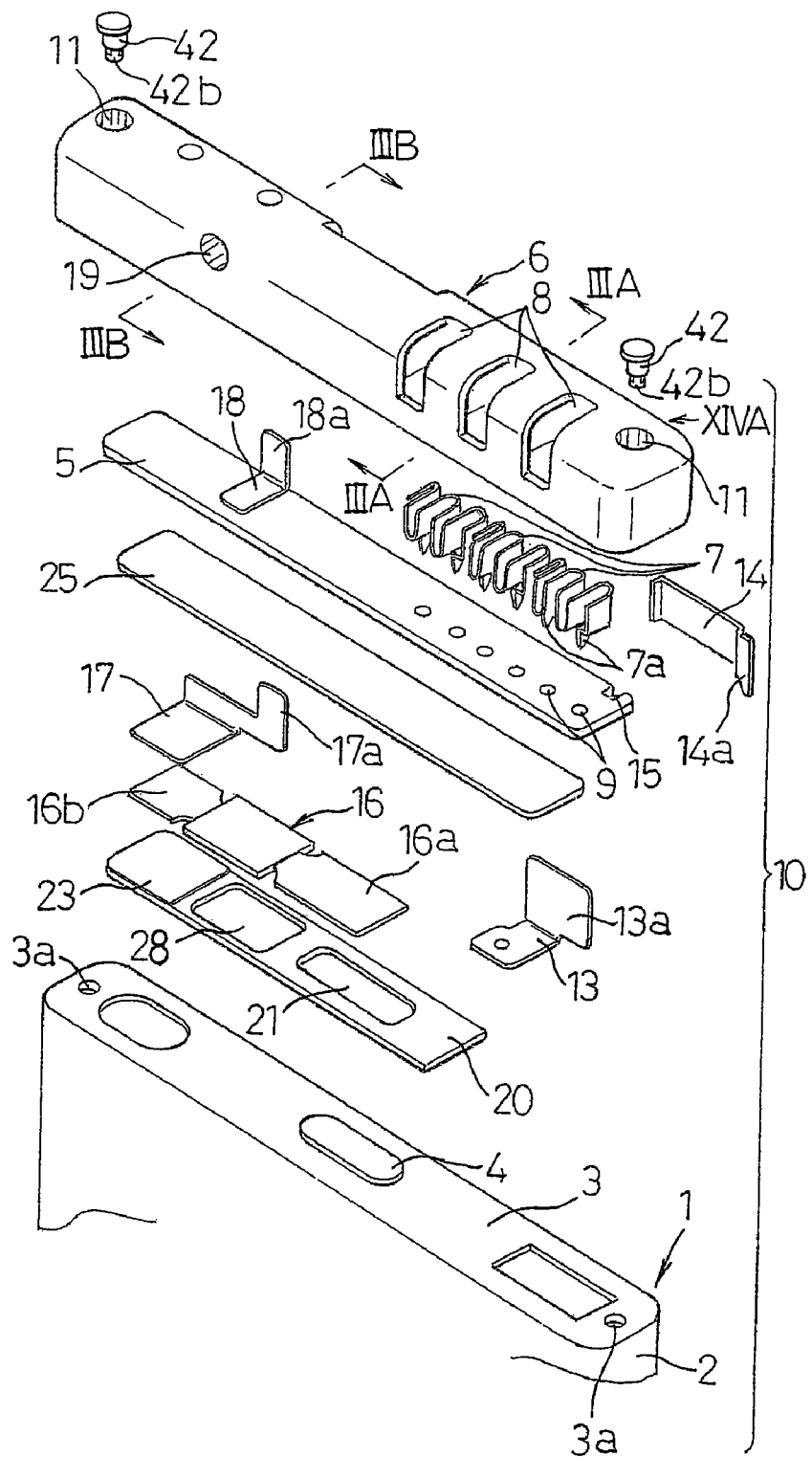
FIG. 13 is an exploded perspective view illustrating major parts of a battery pack according to a fourth embodiment of the present invention.

The negative electrode terminal 4 is connected to the circuit substrate 5 through a safety protection device 16 such as a temperature fuse and a PTC element. More specifically, a connection piece 16a at one end of the safety protection device 16 is connected to the electrode terminal 4 by welding, and another connection piece 16b at the other end of the safety protection device 16 is securely welded to a second connection bracket 17, which has an upright portion 17a on one side. As shown in FIG. 1 and FIG. 3B, a third connection bracket 18, which has an upright portion 18a that overlaps the inner face of the upright portion 17a, is securely welded to the circuit substrate 5. These upright portions 17a and 18a of the connection brackets 17 and 18 are welded together through apertures 19 provided for the processing purpose across the end case 6 in the width direction at the position corresponding to these upright portions 17a and 18a. Thus the negative electrode terminal 4 is connected to the circuit substrate 5 through the safety protection device 16 and the connection brackets 17 and 18. The electrical connection structure of the battery pack 10 of this embodiment has been described with reference to FIG. 3A and FIG. 3B, which are cross sections taken in the direction of arrows IIIA-IIIA and IIIB-IIIB in FIG. 1, respectively. Note, FIG. 3A is also a cross section taken in the direction of arrows IIIA-IIIA in FIG. 9 and FIG. 13, and FIG. 3B is also a cross section taken in the direction of arrows IIIB-IIIB in FIG. 9 and FIG. 13, since the other embodiments to be described later and shown in FIG. 9 and FIG. 13 have the same electrical connection structure as the battery pack 10 of this embodiment.

Referring to FIG. 1, a first insulation plate 20 is arranged between one end face 3 of the battery case 2 and the safety protection device 16, and fixedly attached to the end face by adhesive provided on its underside. The first insulation plate 20 is formed with a through hole 21 in the center through which the electrode terminal 4 extends, and a heat conducting aperture 28 at a position corresponding to the element part of the safety protection device 16 so that the element part faces the end face 3 of the battery case 2. An adhesive 23 is applied on the upper face at the other end of the safety protection device 16 where the connection piece 16b is provided, to retain the connection piece 16b in position. The heat conducting aperture 28 is filled with silicone 24 as shown in FIG. 4B so that heat from the battery 1 is efficiently conducted to the element part. A second insulation plate 25 is arranged on and bonded to the safety protection device 16 with an adhesive provided on its underface, so as to secure insulation between the safety protection device 16 and the circuit substrate 5.

Next, the assembling process of the thus structured battery pack 10 will be described. First, the first insulation plate 20 is placed on and bonded to the end face 3 of the battery 1, as shown in FIG. 4A. Next, the heat conducting aperture 28 of the first insulation plate 20 is filled with silicone 24 as shown in FIG. 4B, the safety protection device 16 is placed on the first insulation plate 20, and the connection piece 16a at one end is welded to the electrode terminal 4, with the second connection bracket 17 being welded to the connection piece 16b at the other end. The first connection bracket 13 is welded to a side portion of the first insulation plate 20 that is on the end face of the battery 1. Next, as shown in FIG. 4C, the second insulation plate 25 is placed over and bonded to the safety protection device 16 and the first connection bracket 13.

Meanwhile, the external connection terminals 7 are set in predetermined positions in the end case 6 where they face the connection windows 8, as shown in FIG. 1, and the connection plate 14 is inserted between the aperture 6a in one side wall and the support wall 6b. The third connection bracket 18 is welded to a predetermined position on the circuit substrate 5. Next, the circuit substrate 5 is inserted from the bottom opening of the end case 6, the ends of the connection legs 7a of the external connection terminals 7 protruding through the connection holes 9 are soldered to the electrodes formed around the connection holes 9, and the end of the connection leg 14a of the connection plate 14 protruding from the connection notch 15 is soldered to the electrode formed around the connection notch 15.

Figure 5:
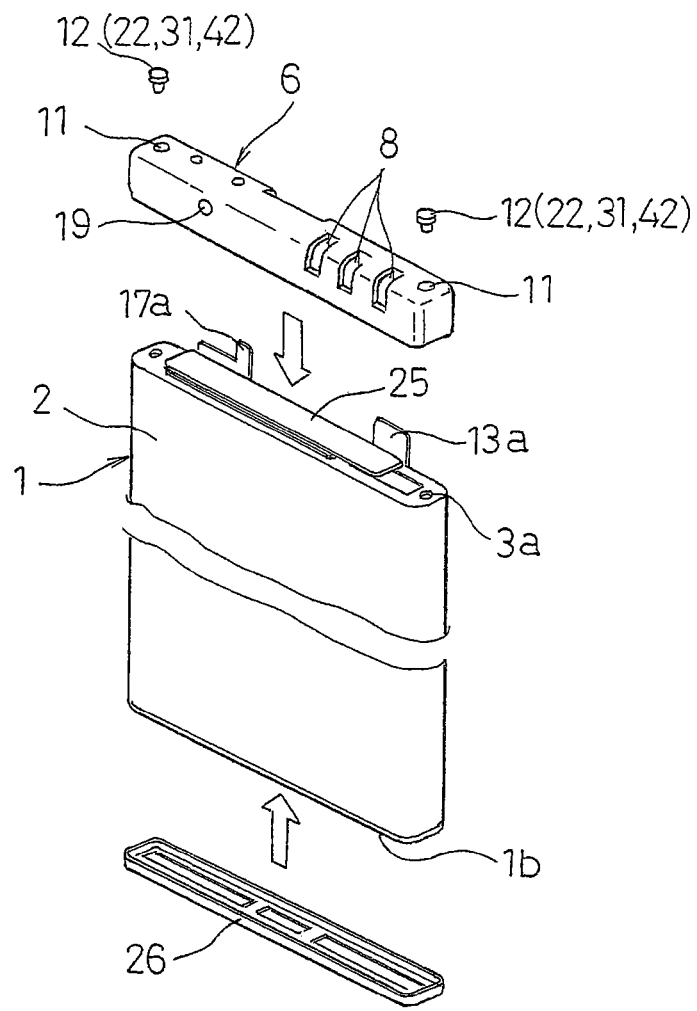
FIG. 5 is a perspective view illustrating an assembling process step of the battery pack of the present invention.

Next, as shown in FIG. 5, the end case 6 accommodating the circuit substrate 5 inside is coupled onto the end face 3 of the battery 1, so that the upright portion 13a of the first connection bracket 13 makes surface contact with the outer face of the connection plate 14, and the upright portion 17a of the second connection bracket 17 makes surface contact with the outer face of the upright portion 18a of the third connection bracket 18. Screws 12 are inserted into the attachment holes 11. A nail hook 26 is bonded to the other end face 1b of the battery 1, which is a nail catch for allowing easy removal of the battery pack 10.

Figure 6:
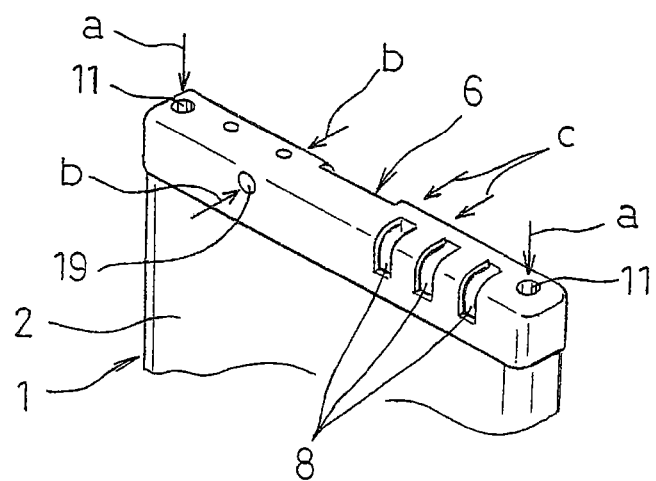
FIG. 6 is a perspective view illustrating an assembling process step of the battery pack of the present invention.

Next, as shown in FIG. 6, a screw driver (tool) is inserted into the attachment holes 11 at both ends of the end case 6 as indicated by the arrows a to engage with the heads 12a of the screws 12, and by rotating the screw driver while applying pressure, the tips of the screws 12 are engaged into the circular indentations 3a formed in the end face 3 of the battery 1 while forming female threads in the inner peripheral surface of the indentations, so that the both ends of the end case 6 are secured to the battery 1 through the screws 12. Welding electrodes are inserted from both sides into the apertures 19 in the end case 6 as indicated by the arrows b, and by applying a welding current and pressure, the upright portions 17a and 18a of the connection brackets 17 and 18 are welded together (see FIG. 3B). Also, a pair of welding electrodes are inserted into the aperture 6 in the end case 6 as indicated by the arrows c and abutted on the upright portion 13a of the first connection bracket 13, and by applying a welding current and pressure, the first connection bracket 13 and the connection plate 14 are welded together (see FIG. 3A).

Figure 7:
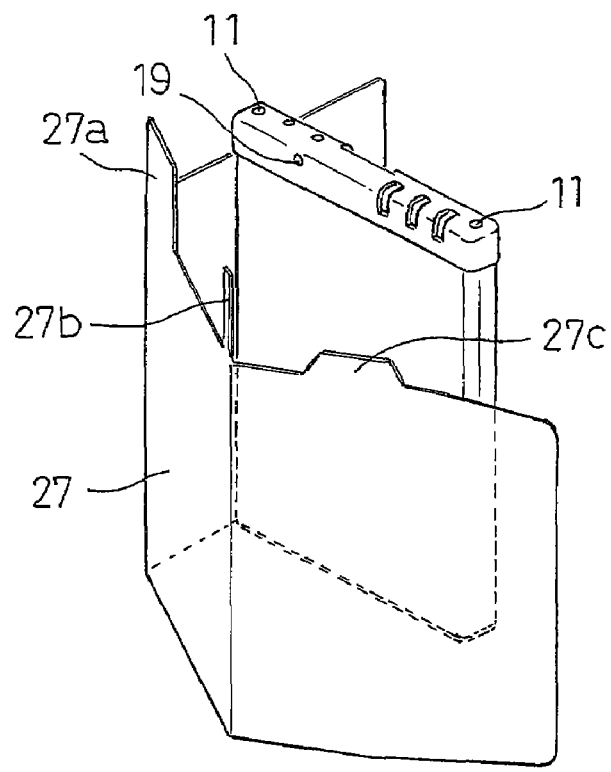
FIG. 7 is a perspective view illustrating an assembling process step of the battery pack of the present invention.
Figure 8:
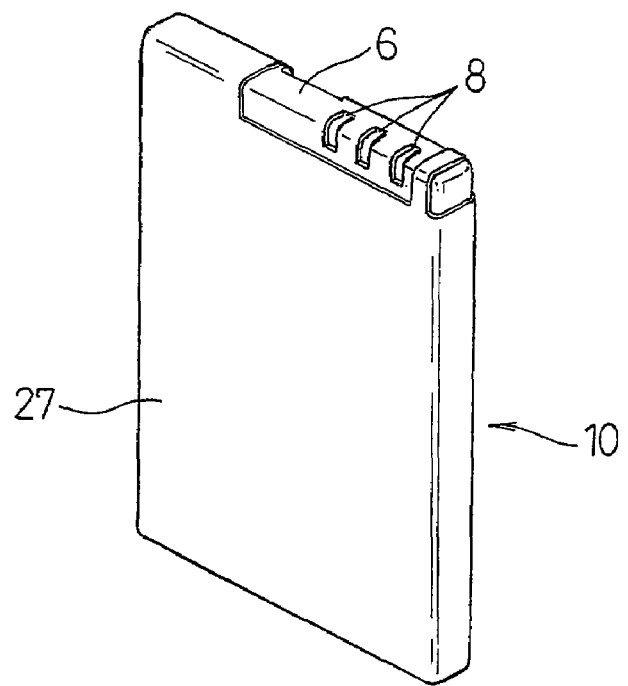
FIG. 8 is a perspective view illustrating the complete battery pack of the present invention.

Next, as shown in FIG. 7, an outer label 27, which is a synthetic resin sheet with an adhesive applied on its back side, is wound around and bonded to the circumferences of the battery 1, the lower part of the end case 6, and the nail hook 26. Sealing pieces 27a, 27b, 27c extend from the upper edge of the outer label 27 at positions corresponding to the attachment holes 11 and the apertures 19 and 6a in the upper part of the end case 6, and these sealing pieces 27a, 27b, 27c are bonded along the surface of the end case 6 so that the holes 11 and the apertures 19 and 6a are covered. Thus, as shown in FIG. 8, the battery pack 1 is complete.

The battery pack 10 of this embodiment has a compact structure since the end case 6 is secured to one end of the battery 1 by tightening the screws 12 and the case does not accommodate the whole of the battery 1 and the circuit substrate 5. Also the connection resistance is reduced because the connection path between the battery 1 and the circuit substrate 5 and the external connection terminals 7 inside the end case 6 is made shorter.

The battery 1 and the end case 6 are securely coupled together by a simple process step of engaging the tip of the screw 12 into the circular indentation 3a in the end face 3 of the battery 1, and therefore the battery pack 10 achieves both high reliability and productivity. Since the end case 6 is secured to the end face 3 of the battery 1 with screws 12, the battery pack resists a large force applied in a direction parallel to the end face 3 of the battery 1 (shear direction to the screw 12), as well as a large force that acts to separate the end case 6 from the battery 1 (screw pulling direction) by the screw thread engagement, and therefore the battery pack has high strength to external forces from all directions. Further, because the screws 12 are forced into the end face 3 of the battery 1 while forming female threads, when the battery pack 10 is disassembled once by loosening the screws 12 and removing the end case 6, it cannot be re-assembled because the female threads are damaged. This prevents production of fake battery packs with reused batteries, and prevents fake products that lack safety standards from going into the market.

The battery case 2 serves as the positive electrode terminal and the negative electrode terminal 4 of the battery 1 is provided on its end face 3; the first connection bracket 13 is secured to the end face 3 of the battery case 2, the connection plate 14 that is partly connected to the circuit substrate 5 is arranged on the inner side of one side wall of the end case 6, and the upright portion 13a of the first connection bracket 13 and the connection plate 14 are welded together through the aperture 6a formed in the end case 6. The positive electrode of the battery 1 and the circuit substrate 5 are therefore electrically connected with good working efficiency and high productivity is thereby achieved. Also, the connection path can be made short and the connection resistance is reduced.

One end of the safety protection device 16 is connected to the electrode terminal 4 on one end face 3 of the battery 1, and the other end of the safety protection device 16 is connected to the circuit substrate 5. The safety protection device 16 such as a temperature fuse and a PTC element is interposed between the electrode terminal 4 and the circuit substrate 5 in contact with or in close proximity with the end face 3 of the battery 1 making use of the space in one side of the electrode terminal 4, so that the electric current is shut off when the temperature of the battery 1 rises too high, and thus while the structure is compact, the safety features are improved.

The second and third connection brackets 17 and 18 having upright portions 17a and 18a that overlap with each other are secured to the other end of the safety protection device 16 and the circuit substrate 5, respectively, and these upright portions 17a and 18a of the connection brackets 17 and 18 are welded together through the apertures 19 opened in the end case 6, and thus the circuit substrate 5 and the safety protection device 16 are connected to each other with good productivity through these connection brackets 17 and 18 by welding. Alternatively, the safety protection device 16 may be omitted, and the electrode terminal 4 and the circuit substrate 5 may be connected to each other through a connection bracket(s).

The external connection terminals 7 set inside the end case 6 are of the type that establishes or shuts connection between the battery and equipment by the connectors on the equipment side being inserted or removed. In a portable electronic equipment or the like that has a battery accommodating space in which the battery pack 10 is set, the external connection terminals 7 of this type ensure highly reliable power supply even in an environment of use in which the equipment is subjected to vibration or impact. Also, even this type of the external connection terminals 7 is set inside the end case 6 easily and compactly.

While the screw 12 in this embodiment only has the function of securely attaching the end case 6 to the battery 1 and does not have the function of electrically connecting the battery case 2 with the circuit substrate 5, one alternative is to make the head 22a of the screw 12 to contact the electrode on the circuit substrate 5, or, if necessary, to connect part of the head 12a to the electrode by laser beam welding, so as to establish electrical connection at the same time. This makes the first connection bracket 13 and the connection plate 14 redundant and the structure is further simplified.

Second Embodiment

A second embodiment of the invention is described next. The elements that are common to the above-described first embodiment are given the same reference numerals and will not be described again, and only the differences will be described.

Figure 10:
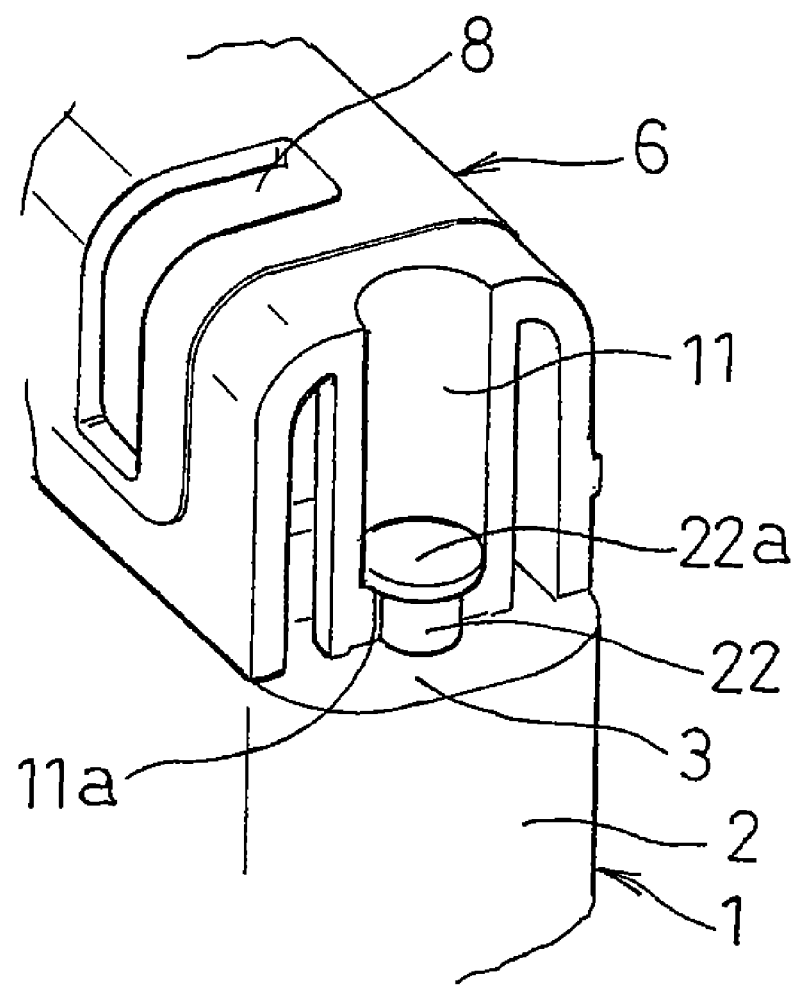
FIG. 10 is a partially broken perspective view taken from the direction of arrow X of FIG. 9, illustrating the main structure of the battery pack according to the second embodiment.

In the first embodiment, the battery case 2 and the end case 6 are securely united by forcing the tips of the screws 12 into the end face 3 of the battery case 2. In this embodiment, as shown in FIG. 9 and FIG. 10, coupling pins 22 with heads 22a are set in the attachment holes 11 at both ends of the end case 6 with the heads 22a engaging with the steps 11a in the attachment holes 11, and the tips of the pins are welded to the end face 3 at both ends of the battery case 2. The welding method applicable here includes spot welding, arc welding, laser welding and others, among which spot welding is most preferable because of low cost and good working efficiency.

The difference between this embodiment and the first embodiment in the assembling process is as follows: In the first embodiment, a screw driver (tool) was inserted into the attachment holes 11 at both ends of the end case 6, and by rotating the screw driver while applying pressure to the screws 12, the tips of the screws 12 were engaged into the circular indentations 3a formed in the end face 3 of the battery 1, so that the end case 6 was securely united with the battery 1. In the second embodiment, welding electrodes are inserted into the attachment holes 11 at both ends of the end case 6 as indicated by the arrows a in FIG. 6, and abutted on the heads 22a of the coupling pins 22, and by applying a welding current and pressure, the tips of the coupling pins 22 are welded to the end face 3 of the battery 1, so that the both ends of the end case 6 are united to the battery 1 through the coupling pins 22. Other process steps are the same as those of the first embodiment. Welding electrodes are inserted from both sides into the apertures 19 in the end case 6 as indicated by the arrows b, and by applying a welding current and pressure, the upright portions 17a and 18a of the connection brackets 17 and 18 are welded together (see FIG. 3B). Also, a pair of welding electrodes are inserted into the aperture 6a in the end case 6 as indicated by the arrows c and abutted on the upright portion 13a of the first connection bracket 13, and by applying a welding current and pressure, the first connection bracket 13 and the connection plate 14 are welded together (see FIG. 3A).

According to this embodiment, the battery 1 and the end case 6 are securely coupled together by a simple process step of welding the tip of the coupling pin 22 to the end face 3 of the battery 1, and the battery pack 10 thereby achieves both high reliability and productivity.

While the coupling pin 22 in this embodiment only has the function of securely attaching the end case 6 to the battery 1 and does not have the function of electrically connecting the battery case 2 with the circuit substrate 5, one alternative is to connect the head 22a of the coupling pin 22 to the electrode on the circuit substrate 5 by welding to establish electrical connection at the same time, so that the first connection bracket 13 and the connection plate 14 are made redundant and the structure is further simplified.

Third Embodiment

A third embodiment of the battery pack of the invention is described next. The elements that are common to the above described first and second embodiments are given the same reference numerals and will not be described again, and only the differences will be described.

In the second embodiment, the tip of the coupling pin 22 was directly connected to the end face 3 of the battery case 2 by resistance welding. If, however, the end face 3 of the battery case 2 is made of aluminum or an aluminum alloy while the coupling pin 22 is made of an iron material such as stainless steel or nickel-plated steel so as to secure sufficient strength despite its small size, there may be cases where, by the direct resistance welding method, it is hard to achieve necessary attachment strength with high reliability. To solve this problem, in the third embodiment, the end face 3 of the battery case 2 is made of the same material as the coupling pin 22 at least in the portion to which the tip of the coupling pin 22 will be attached.

Figure 11:
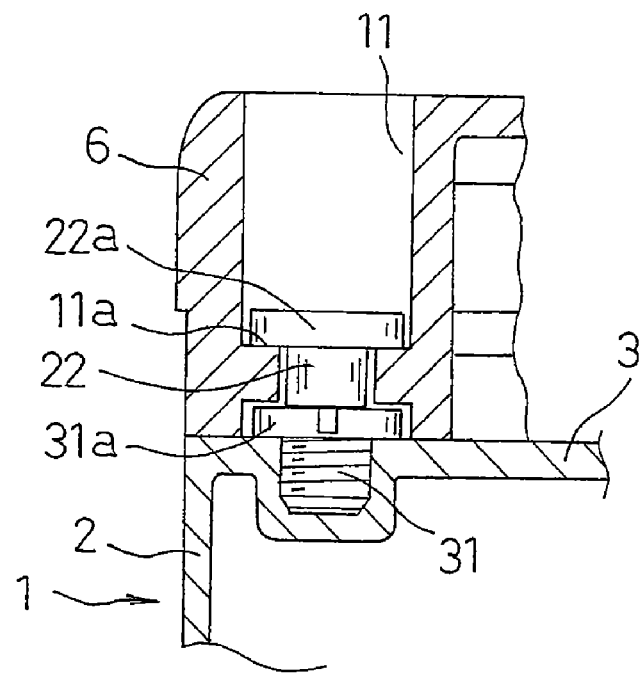
FIG. 11 is a cross-sectional view illustrating major parts of a battery pack according to a third embodiment of the present invention.

In this embodiment, as shown in FIG. 11, a screw 31 made of the same type of material as the coupling pin 22, i.e., stainless steel or nickel-plated steel, is securely tightened to a portion where the tip of the coupling pin 22 will be attached in the end face 3 of the battery case 2, and the tip of the coupling pin 22 is connected to the top of the head 31a of the screw 31 by resistance welding.

Figure 12A:
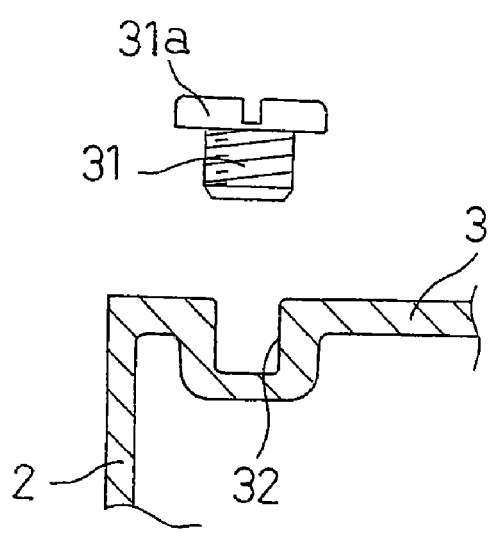
FIG. 12A and FIG. 12B are cross-sectional views illustrating the process steps of attaching a screw in the third embodiment.
Figure 12B:
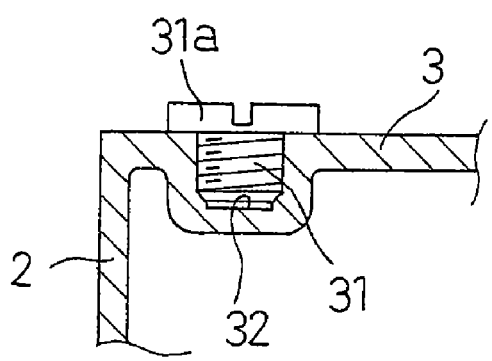

More specifically, the sealing plate that forms the end face 3 of the battery case 2 is made of aluminum or an aluminum alloy, with a relatively large thickness of, for example, about 0.8 to 1.5 mm. A circular indentation 32 that works as a screw pilot hole, into which the screw 31 is driven while forming female threads, is formed at either end of the end face 3 of the battery case 2 when press-forming the sealing plate (end face 3) as shown in FIG. 12A, and after that, as shown in FIG. 12B, the screw 31 is engaged into the hole and made in one piece with the end face 3, so that the top face of the screw head 31a will form the welding surface at the bottom of the coupling pin 22.

For example, if the screw 31 has metric fine screw threads with a nominal diameter of 1.2 mm, the screw thread height is 0.13 mm and the screw pitch is 0.25 mm. If the circular indentation 32 has an inside diameter of 0.9 mm and a depth of 1.4 mm, the screw 31 will engage into the indentation 32 about four threads, whereby, even if the end face 3 is made of aluminum or an aluminum alloy, the screw 31 is attached with a necessary strength in the axial direction.

The specification of the screw 31 given above is only an example, and any of fine thread screws with a nominal diameter ranging from 1.0 to 2.0 mm and a screw pitch ranging from 0.2 to 0.4 mm may preferably be used. Correspondingly, the circular indentation 32 may vary in its inside diameter from 0.6 to 1.7 mm, and in its depth from 0.8 to 1.6 mm.

As described above, with this embodiment, the screw 31 made of the same type of material as the coupling pin 22 is secured in the end face 3 of the battery case 2 at least in a portion where the tip of the coupling pin 22 will be attached, and the coupling pin 22 is connected to the top face of the screw head 31a by resistance welding. As the pin and screw are both made of the same type of material, they are readily secured to each other with sufficient strength and high reliability. Also, this is readily achieved only by adding a simple process step of securely engaging the screw 31 into the end face 3 of the battery 1.

While the coupling pin 22 in this embodiment only has the function of securely attaching the end case 6 to the battery 1 and does not have the function of electrically connecting the battery case 2 with the circuit substrate 5, one alternative is to connect the head 22a of the coupling pin 22 with the electrode on the circuit substrate 5 by welding so as to establish electrical connection at the same time, so that the first connection bracket 13 and the connection plate 14 are made redundant and the structure is further simplified.

Fourth Embodiment

A fourth embodiment of the battery pack of the invention is described next. The elements that are common to the above described first to third embodiments are given the same reference numerals and will not be described again, and only the differences will be described.

In this embodiment, a coupling pin 42 shown in FIG. 13A to FIG. 14B is used instead of the screw 12 of the first embodiment, the coupling pin 22 of the second embodiment, and the combination of the screw 31 and the coupling pin 22 of the third embodiment. That is, the end case 6 includes attachment holes 11 at both ends extending in the vertical direction and having a step 11a near the bottom end, and the coupling pins 42 are inserted in these attachment holes 11, with their heads 42a being engaged with the steps 11a, and their tips are secured to one end face 3 of the battery case 2 at both ends by spot welding (resistance welding) so as to securely unite the battery case 1 and the end case 6.

Figure 14A:
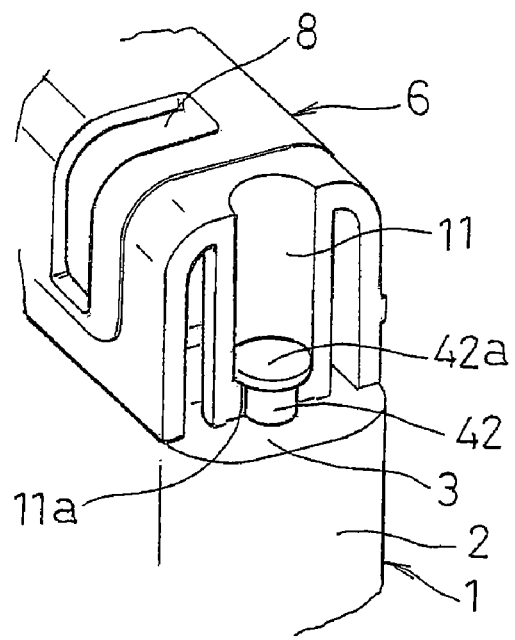
FIG. 14A and FIG. 14B illustrate the main structure of the battery pack of the fourth embodiment, FIG. 14A being a partially broken perspective view taken from the direction of arrow XIVA of FIG. 13 and FIG. 14B being a cross-sectional view of the same part.
Figure 14B:
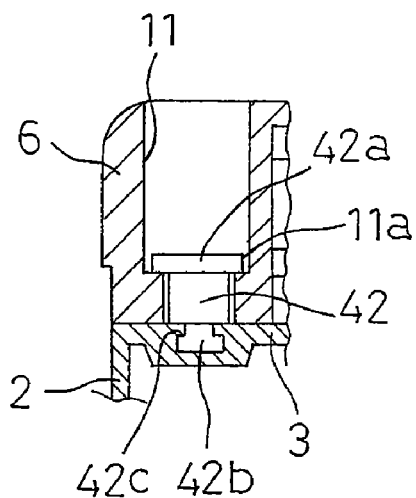
Figure 15A:
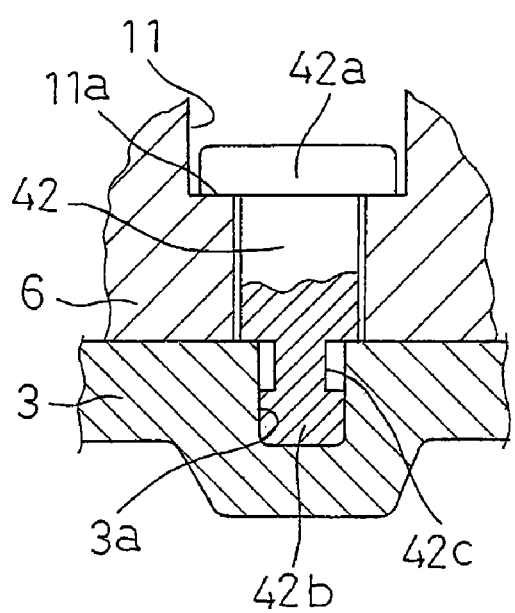
FIG. 15A and FIG. 15B illustrate the process steps of welding a coupling pin in the same embodiment, FIG. 15A being a cross-sectional view illustrating the state before welding and FIG. 15B being a cross-sectional view illustrating the state after the welding.

This spot-welded part at the tip of the coupling pin 42 is described in more detail below with reference mainly to FIG. 14B, FIG. 15A, and FIG. 15B. The battery case 2, including its end face 3, is made of aluminum or an aluminum alloy. The end face 3 has a relatively large thickness of, for example, about 0.8 to 1.5 mm. At either end of the end face 3, a circular hole 3a having an inside diameter of about 0.6 to 1.7 mm and a depth of about 0.8 to 1.6 mm is press-formed as shown in FIG. 15A in detail. The hole 3a need not necessarily be circular and may be square.

Figure 16A:
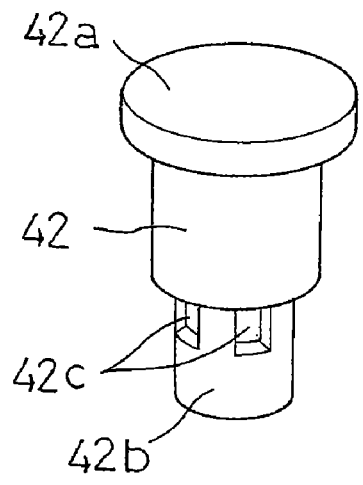
FIG. 16A to FIG. 16E are perspective views illustrating various examples of structures for the coupling pin in the same embodiment.
Figure 16B:
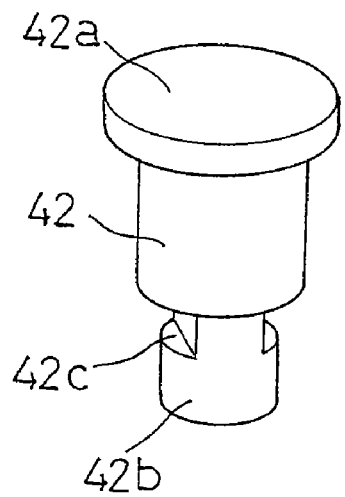
Figure 16C:
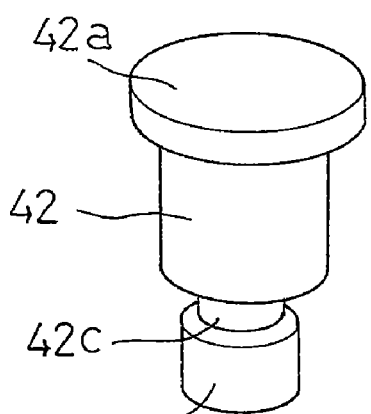
Figure 16D:
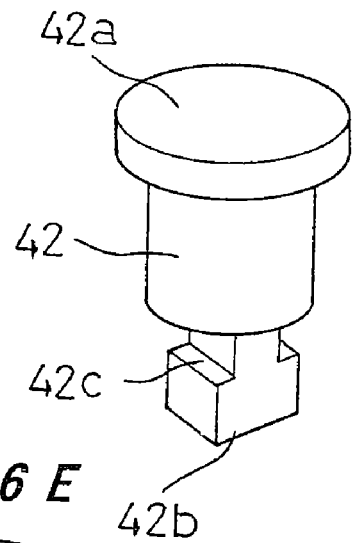
Figure 16E:
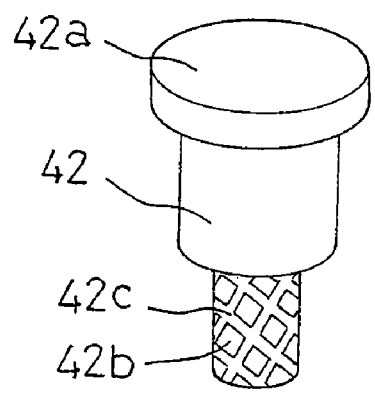

The coupling pin 42 should preferably be made of an iron material such as nickel-plated steel or stainless steel so as to secure sufficient strength despite its small size. As shown in FIG. 15A in detail, the coupling pin 42 includes a protrusion 42b at its tip that fits in the hole 3a, and a circumferential recess 42c formed at the base end of the protrusion 42b. Preferably, the coupling pin 42 has an axial diameter of 1.0 to 2.0 mm, with the protrusion 42b having a size corresponding to the hole 3a, and the recess 42c having an axial width of about one third to half of the depth of the hole 3*a* and a radial depth of about one fifth to one third of the inside diameter of the hole 3*a*. The shape and number of the recess 42*c* may be freely selected from various options: For example, square recesses may be formed at two to four locations in the circumferential direction as shown in FIG. 16A, circular arc notches may be cut from both sides into the protrusion 42*b* as shown in FIG. 16B, a continuous annular groove may be provided around the entire circumference as shown in FIG. 16C, slot grooves may be formed if the protrusion is square as shown in FIG. 16D, and 1 to 2 mm wide and deep recesses 42*c* may be formed on the outer face of the protrusion 42*b* as knurling, as shown in FIG. 16E.

As shown in FIG. 15A, with the protrusion 42*b* of the coupling pin 42 engaging into the hole 3*a* in the end face 3 of the battery case 2, a welding electrode is abutted on the head 42*a* of the coupling pin 42 at either end of the end case 6, and by applying a welding current across the coupling pin 42 and the end face 3 of the battery case 2, the interface between the tip of the coupling pin 42 and the end face 3 of the battery case 2 is heated, whereby the end face 3 of the battery case 2 that is made of aluminum or an aluminum alloy and thus has a low melting point melts and they are welded together. At the same time, the molten metal flows in and fills the recess 42*c* of the protrusion 42*b* as shown in FIG. 15B and provides an anchoring effect, so that the joint between the tip of the coupling pin 42 and the end face 3 of the battery case 2 is rigid enough to withstand forces from all directions.

Figure 15B:
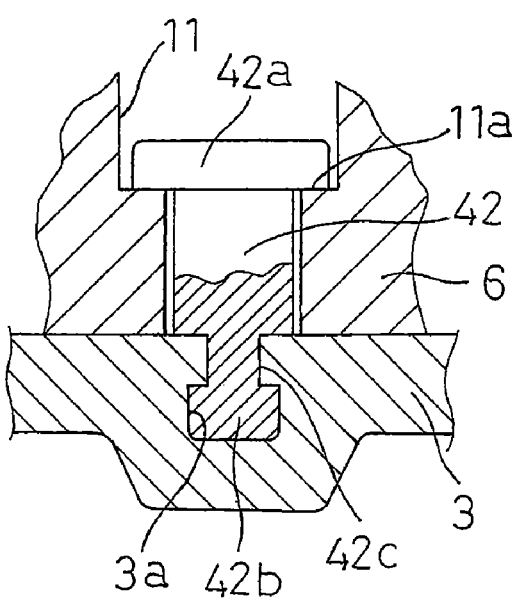
Figure 17A:
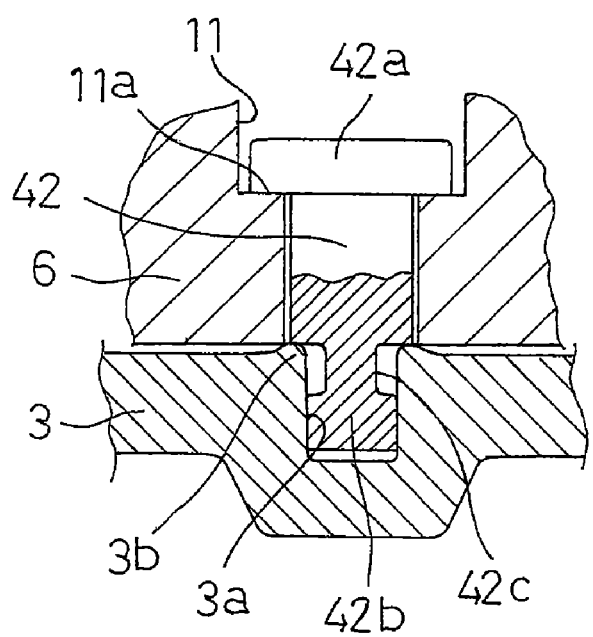
FIG. 17A and FIG. 17B illustrate the process steps of another method of welding a coupling pin in the same embodiment, FIG. 17A being a cross-sectional view illustrating the state before welding and FIG. 17B being a cross-sectional view illustrating the state after the welding.
Figure 17B:
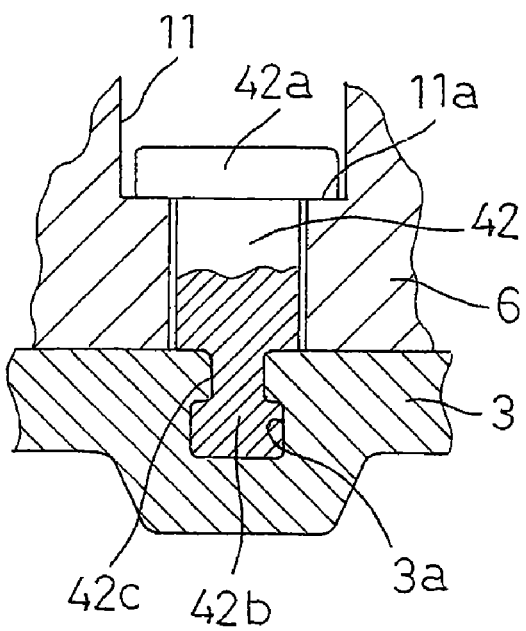

While the periphery of the hole 3*a* is flush with the end face 3 of the battery case 2 in the example shown in FIG. 15A and FIG. 15B, one alternative is to form a boss 3*b* at the periphery of the hole 3*a* when press-forming the hole 3*a*, as shown in FIG. 17A. The end face around the protrusion 42*b* of the coupling pin 42 is abutted on this boss 3*b*, so that the welding current is concentrated at this boss 3*b* during spot welding. This melts the boss 3*b* easily and causes the molten metal to flow in and fill the recess 42*c* smoothly, as shown in FIG. 17B, whereby the anchoring effect is reliably achieved.

In this embodiment, to securely unite the battery 1 and the end case 6, welding electrodes of a spot welder are inserted in the attachment holes 11 at both ends of the end case 6 as indicated by the arrows a in FIG. 6 and abutted on the heads 42*a* of the coupling pins 42, and by applying a welding current and pressure, the tips of the coupling pins 42 are welded to the end face 3 of the battery 1, so that the end case 6 is securely united with the battery 1 at both ends through these coupling pins 42. Other process steps are the same as the other embodiments. Welding electrodes are inserted from both sides into the apertures 19 in the end case 6 as indicated by the arrows b, and by applying a welding current and pressure, the upright portions 17*a* and 18*a* of the connection brackets 17 and 18 are welded together (see FIG. 3B). Also, a pair of welding electrodes are inserted into the aperture 6*a* in the end case 6 as indicated by the arrows c and abutted on the upright portion 13*a* of the first connection bracket 13, and by applying a welding current and pressure, the first connection bracket 13 and the connection plate 14 are welded together (see FIG. 3A).

With this embodiment, the battery 1 and the end case 6 are securely coupled together by a simple process step of spot welding the tip of the coupling pin 42 to the end face 3 of the battery 1, and therefore the battery pack 10 achieves both high reliability and productivity. The tip of the coupling pin 42 is secured to the end face 3 of the battery 1 such that the material forming the end face 3 of the battery 1 bites into the recess 42*c* formed around the protrusion 42*b* at the tip of the coupling pin 42, providing the anchoring effect. Therefore, the battery pack resists a large force applied in a direction parallel to the end face 3 of the battery 1 (shear direction to the coupling pin 42), as well as a large force that acts to separate the end case 6 from the battery 1 (pin pulling direction) by the anchoring effect, and the battery pack has high attachment strength to external forces from all directions.

While the coupling pin 42 in this embodiment only has the function of securely attaching the end case 6 to the battery 1 and does not have the function of electrically connecting the battery case 2 with the circuit substrate 5, one alternative is to make the head 42*a* of the coupling pin 42 to contact the electrode on the circuit substrate 5, or, if necessary, to connect part of the head 42*a* to the electrode by laser beam welding, so as to establish electrical connection at the same time. This makes the first connection bracket 13 and the connection plate 14 redundant and the structure is further simplified.

INDUSTRIAL APPLICABILITY

As described above, the battery pack of the present invention has a compact structure since the end case is secured to one end of the battery in a manner that exhibits a high resistance to external forces from all directions. Also, the connection path between the battery and the circuit substrate and the external connection terminals inside the end case is made shorter, and the connection resistance is reduced. The battery and the end case are securely united by a simple process step, such as forcing the tip of a screw into the end face of the battery, welding the tip of a coupling pin to the end face of the battery, forcing the tip of a screw into the end face of the battery and welding a coupling pin to the screw head, or welding the tip of a coupling pin to the end face of the battery in a manner that provides an anchoring effect. Thus the invention realizes a battery pack that achieves both high reliability and productivity, and is applicable to production of small battery packs for use in portable electronic equipment.

The invention claimed is:

1. A battery pack comprising: a battery; a circuit substrate having a charge/discharge safety circuit and arranged on one end face of the battery; and an end case in which an external connection terminal is set, wherein the circuit substrate is arranged inside the end case, the end case includes attachment holes at both ends thereof extending therethrough and each attachment hole includes a step near the bottom end thereof, and the end case is secured to the battery by screws, each with a screw head, the screw head extending through a respective attachment hole and engaging with the step in the attachment hole in the end case at both ends and tips of the screws being engaged into the end face at both ends of the battery; and the battery case serves as an electrode terminal of one polarity and an electrode terminal of the other polarity is provided on the end face in the battery; a first connection bracket having an upright portion is secured to the end face of the battery case; a connection plate that makes surface contact with the upright portion of the first connection bracket and that is partly connected to the circuit substrate is arranged on the inner side of one side wall of the end case; and the upright portion and the connection plate are welded together through an aperture formed in one side wall of the end case opposite the upright portion.

2. The battery pack according to claim 1, wherein: one end of a safety protection device is connected to the electrode terminal in the end face of the battery case and the other end of the safety protection device is connected to the circuit substrate.

3. The battery pack according to claim 2, wherein: second and third connection brackets having upright portions that overlap each other are secured to the other end of the safety protection device and the circuit substrate, respectively; and the upright portions of the second and third connection brackets are welded together through an aperture opened in the end case.

4. The battery pack according to claim 1, wherein the external connection terminal set in the end case is of the type that establishes or shuts connection between the battery and a device to be connected by a connector on the device side being inserted or removed.

5. A battery pack comprising: a battery, a circuit substrate having a charge/discharge safety circuit and arranged on one end face of the battery; and an end case in which an external connection terminal is set, wherein the circuit substrate is arranged inside the end case, the end case includes attachment holes at both ends thereof extending therethrough and each attachment hole includes a step near the bottom end thereof, and the end case is secured to the battery by coupling pins with heads, the heads of the coupling pins extending through a respective attachment hole and engaging with the step in the attachment hole in the end case at both ends and the tips of the coupling pins being secured to the end face at both ends of the battery; and the battery case serves as an electrode terminal of one polarity and an electrode terminal of the other polarity is provided on the end face in the battery; a first connection bracket having an upright portion is secured to the end face of the battery case; a connection plate that makes surface contact with the upright portion of the first connection bracket and that is partly connected to the circuit substrate is arranged on the inner side of one side wall of the end case: and the upright portion and the connection plate are welded together through an aperture formed in one side wall of the end case opposite the upright portion.

6. The battery pack according to claim 5, wherein the end face of the battery at least in a portion thereof to which the tip of the coupling pin is attached is provided with the same type of material as the coupling pin.

7. The battery pack according to claim 6, wherein the end face of the battery in a portion opposite the tip of the coupling pin is provided with the same type of material as the coupling pin.

8. The battery pack according to claim 5, wherein: one end of a safety protection device is connected to the electrode terminal in the end face of the battery case and the other end of the safety protection device is connected to the circuit substrate.

9. The battery pack according to claim 8, wherein: second and third connection brackets having upright portions that overlap each other are secured to the other end of the safety protection device and the circuit substrate, respectively; and the upright portions of the second and third connection brackets are welded together through an aperture opened in the end case.

10. The battery pack according to claim 5, wherein the external connection terminal set in the end case is of the type that establishes or shuts connection between the battery and a device to be connected by a connector on the device side being inserted or removed.

11. A battery pack comprising: a battery; a circuit substrate having a charge/discharge safety circuit and arranged on one end face of the battery; and an end case in which an external connection terminal is set, wherein the circuit substrate is arranged inside the end case, the end case includes attachment holes at both ends thereof extending therethrough and each attachment hole includes a step near the bottom end thereof, and the end case is secured to the battery by a coupling pin with heads, the heads extending through a respective attachment hole and engaging with the step in the attachment hole in the end case, such that the material forming the end face of the battery bites into a recess formed in an outer periphery at the tip of the coupling pin to secure the tip of the coupling pin to the end face of the battery; and the battery case serves as an electrode terminal of one polarity and an electrode terminal of the other polarity is provided on the end face in the battery; a first connection bracket having an upright portion is secured to the end face of the battery case; a connection plate that makes surface contact with the upright portion of the first connection bracket and that is partly connected to the circuit substrate is arranged on the inner side of one side wall of the end case; and the upright portion and the connection plate are welded together through an aperture formed in one side wall of the end case opposite the upright portion.

12. The battery pack according to claim 11, wherein: the coupling pin includes a protrusion at the tip that has the recess in its peripheral surface; the end face of the battery includes a hole to which the protrusion at the tip of the coupling pin fits; and with the protrusion being fitted in the hole, the tip of the coupling pin and the end face of the battery are joined together by resistance welding.

13. The battery pack according to claim 11, wherein: one end of a safety protection device is connected to the electrode terminal in the end face of the battery case and the other end of the safety protection device is connected to the circuit substrate.

14. The battery pack according to claim 13, wherein: second and third connection brackets having upright portions that overlap each other are secured to the other end of the safety protection device and the circuit substrate, respectively; and the upright portions of the second and third connection brackets are welded together through an aperture opened in the end case.

15. The battery pack according to claim 11, wherein the external connection terminal set in the end case is of the type that establishes or shuts connection between the battery and a device to be connected by a connector on the device side being inserted or removed.

* * * * *